May 2, 1967 R. E. JOHNSON ETAL 3,316,784
LATHE TOOL HOLDER
Filed Oct. 30, 1964 3 Sheets-Sheet 1

INVENTORS
Roger E. Johnson &
Elbert G. Thompson

May 2, 1967  R. E. JOHNSON ETAL  3,316,784
LATHE TOOL HOLDER
Filed Oct. 30, 1964  3 Sheets-Sheet 2

INVENTORS
Roger E. Johnson &
Elbert G. Thompson

May 2, 1967 R. E. JOHNSON ETAL 3,316,784
LATHE TOOL HOLDER
Filed Oct. 30, 1964 3 Sheets-Sheet 3

INVENTORS
Roger E. Johnson &
Elbert G. Thompson

United States Patent Office 3,316,784
Patented May 2, 1967

3,316,784
LATHE TOOL HOLDER
Roger E. Johnson, Bethel Park, and Elbert G. Thompson, Library, Pa., assignors to Blaw-Knox Company, Pittsburgh, Pa., a corporation of Delaware
Filed Oct. 30, 1964, Ser. No. 407,653
5 Claims. (Cl. 82—24)

This invention relates to a lathe tool holder and particularly to a lathe tool holder which in use brings about a marked increase in efficiency of the turning operation and precision of the work done. Our lathe tool holder provides for optimum adjustment for work of varying diameter and at the same time brings about diminution of cantilever effect between the tool holder and the work, minimizing chattering and promoting cutting speed and precision.

Our lathe tool holder, while of general application, is particularly well adapted for the turning of large and heavy work such as rolling mill rolls in which a large difference in the diameters of the portion of the work being turned exists. For example a rolling mill roll may have a roll body of as much as thirty-six to forty-eight inches in diameter while the roll necks may be of the order of ten to fifteen inches in diameter. The carriage upon which the tool holder is mounted and which traverses the lathe bed longitudinally is disposed to clear the roll body so that when the roll necks are being turned down the tool holder projects a considerable distance in cantilever fashion from the carriage.

Our tool holder is made in two parts comprising a massive cross slide mounted on the carriage and adjustably positionable transversely of the carriage and a tool post also mounted on the carriage and adjustably positionable transversely of the carriage together with means for fastening together the cross slide and the tool post in respective adjusted transverse positions thereof on the carriage, and tool means carried by the tool post. Means are provided acting between the carriage and the cross slide for moving the cross slide relatively to the carriage and means are provided acting between the cross slide and the tool post for moving the tool post relatively to the cross slide. The tool post is braced against the cross slide, preferably having a portion interfitting with the cross slide.

The carriage preferably has a plurality of transverse infeedways and the cross slide is preferably slidably mounted on one of the infeedways while the tool post is slidably mounted on another of the infeedways. The cross slide and tool post are preferably individually slidable on their respective infeedways to selective adjusted relative positions. Means preferably including bolt means may be provided for fastening the cross slide and tool post together.

For turning down the necks of a roll such as above described the cross slide is advanced a substantial portion of the distance from the carriage with the work and the tool post is advanced relatively to the cross slide to bring the tool into operative relationship with the work. This provides an unprecedentedly firm support for the tool when turning a portion of the work of relatively small diameter, minimizing chattering and promoting accuracy of turning. The elements are preferably designed so that the resultant of forces acting on the tool during turning passes through the connection between the cross slide and the carriage so that cantilever action of the tool and tool post is avoided or minimized.

Other details, objects and advantages of the invention will become apparent as the following description of a present preferred embodiment thereof proceeds.

In the accompanying drawings we have shown a present preferred embodiment of the invention in which FIGURE 1 is a diagrammatic side elevational view of a portion of a lathe having our improved tool holder applied thereto and showing the relationship of the tool holder to the work;

FIGURE 6 is an enlarged diagrammatic view of the tool holder as viewed from the front thereof, i.e., from the position of the work being acted on;

Figure 2:
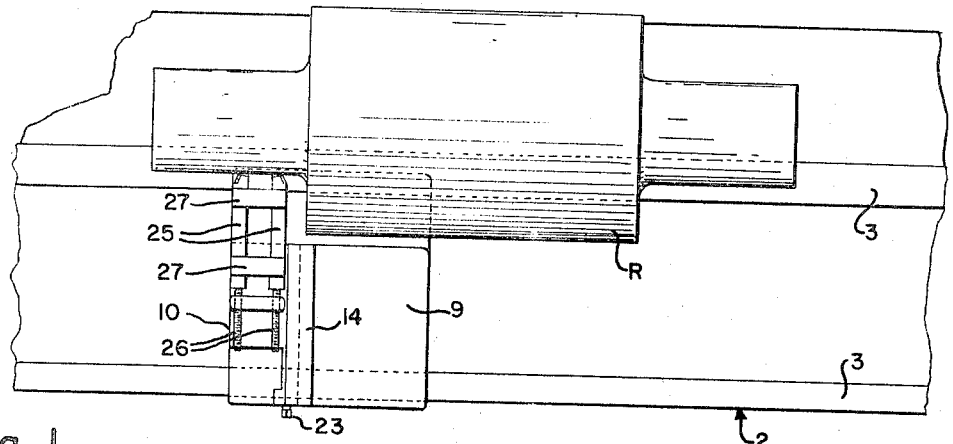
FIGURE 2 is a diagrammatic plan view of the structure shown in FIGURE 1.
Figure 1:
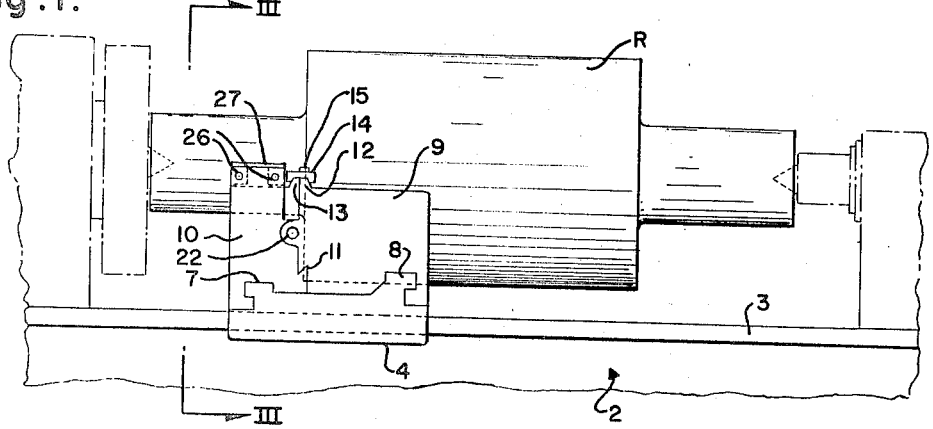

Referring now more particularly to the drawings, the lathe has a bed designated generally by reference numeral 2 having longitudinal ways 3 supporting and guiding a carriage 4 which is moved longitudinally along the ways 3 by screw 5 threaded through a nut 6 fixedly mounted in the carriage 4. The lathe bed and the portion of the carriage cooperating therewith and the means for moving the carriage longitudinally of the lathe bed may be conventional.

Figure 8:
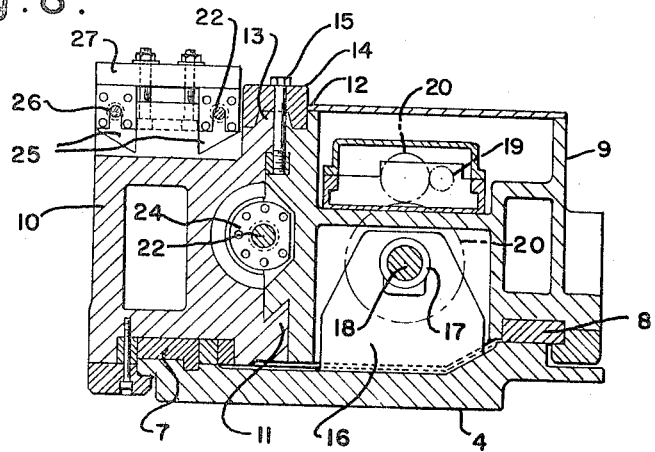
FIGURE 8 is a vertical longitudinal cross-sectional view taken on the line VIII—VIII of FIGURE 5.

The carriage 4 has spaced apart transversely extending infreedways 7 and 8 respectively. Mounted for transverse movement guided by the infeedway 8 is a cross slide 9. Mounted for transverse movement guided by the infeedway 7 is a tool post 10. The cross slide 9 and the tool post 10 together constitute our improved tool holder. The tool post 10 is braced against the cross slide 9 and has a portion 11 interfitting with the cross slide as shown in FIGURES 1, 6, 7 and 8. The upper portions of the cross slide 9 and the tool post 10 have opposed upward projections 12 and 13 respectively each with a downwardly and outwardly inclined outer face, and a holding member 14 as shown in cross section in FIGURE 8 is applied thereto and fastened to the tool post 10 by bolts 15. Thus although the cross slide and tool post are movable individually relatively to the carriage and to each other the cross slide and tool post effectively constitute a unitary tool holder which is extensible toward the work by advancing the tool post relatively to the cross slide. The cross slide may be advanced part way toward the work and the tool post may then be adjustably positioned relatively to the cross slide to bring the tool into operative engagement with the work. During relative movement of the tool post and cross slide the holding member may be loosened or released by loosening the bolts 15 although the parts may be precision machined so that loosening of the holding member when the tool post is to be moved relatively to the cross slide may not be necessary.

The carriage 4 has an upstanding mounting portion or plate 16 which extends generally parallel to the length of the lathe in which is mounted a nut 17 through which passes a cross feed screw 18 for the cross slide 9, the screw 18 being in threaded engagement with the nut 17. Means such as a crank or motor (not shown) drive a shaft 19 which through gearing 20 turns the screw 18 to move the cross slide 9 transversely of the carriage 4 or toward and away from the work.

The cross slide 9 has a protruding portion 21 in which is journaled for rotation a screw 22 having a squared outer end 23 for reception of a hand crank, the screw 22 passing through and threadedly engaging a nut 24 fixedly mounted in the tool post 10. Thus the tool post may be moved relatively to the cross slide.

In the structure shown in the drawings the tool post 10 is shown as carrying two tool bars 25 which may be of conventional construction. The tool bars 25 are adjustable toward and away from the work relatively to the tool post by screws 26 and are clamped in desired adjusted positions by tool bar clamps 27. Each tool bar has an insert or bit 28 which may be conventional.

Figure 3:
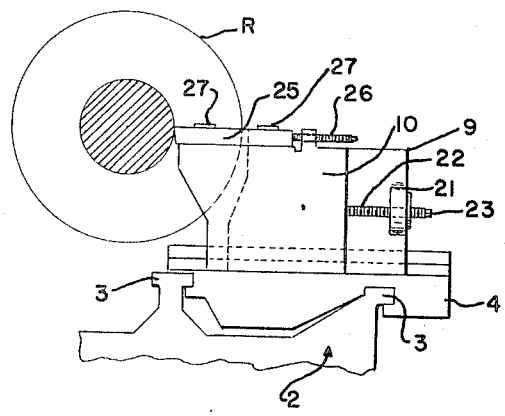
FIGURE 3 is a diagramamtic vertical transverse cross-sectional view taken on the line III—III of FIGURE 1.
Figure 4:
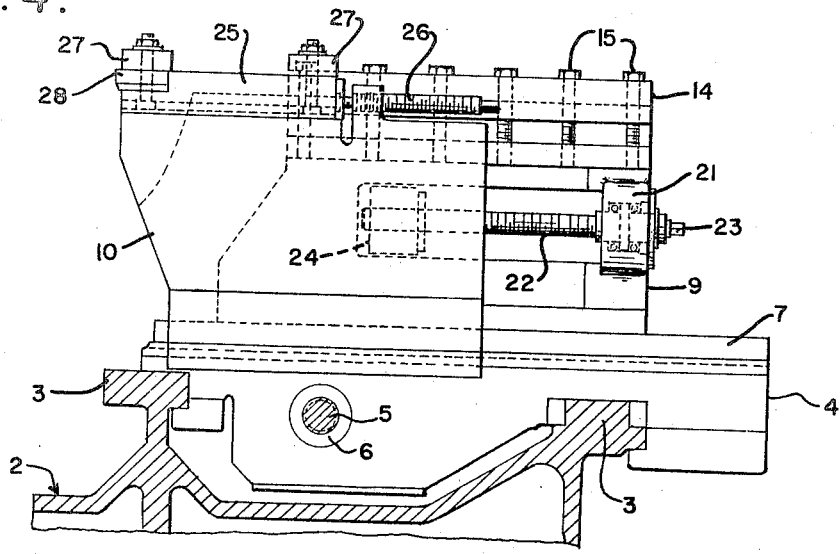
FIGURE 4 is a view of a portion of the structure shown in FIGURE 1 but less diagrammatic and to substantially enlarged scale.
Figure 5:
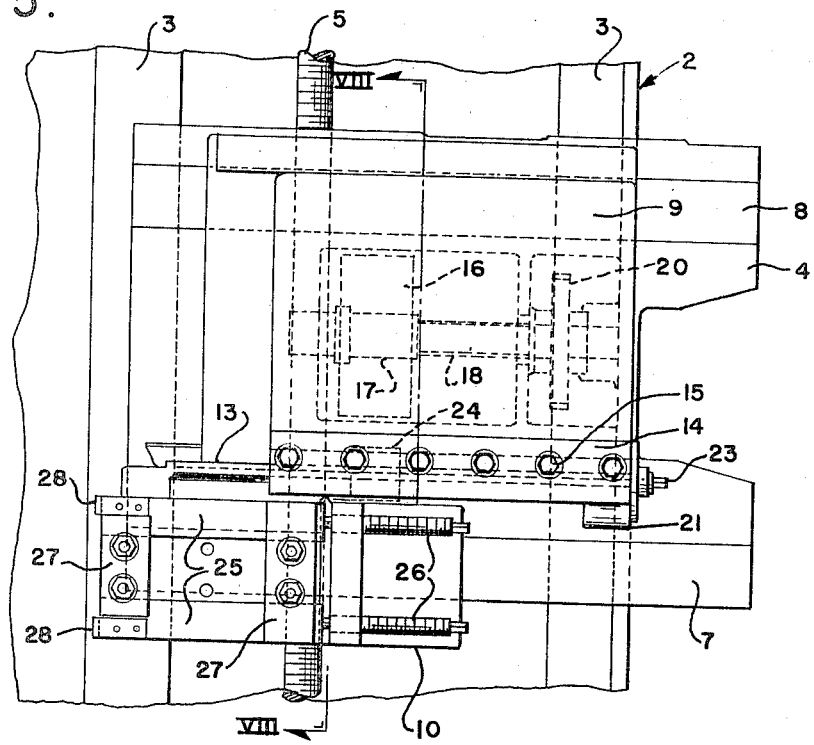
FIGURE 5 is a top plan view of the structure shown in FIGURE 4.
Figure 6:
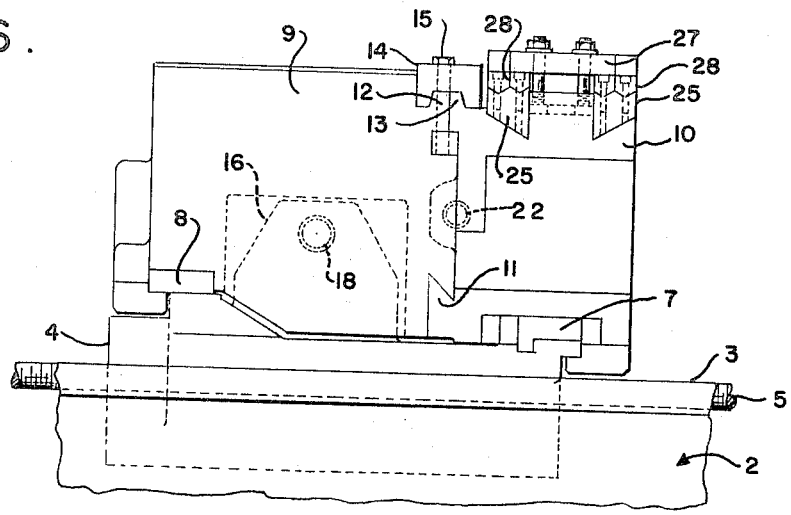
Figure 7:
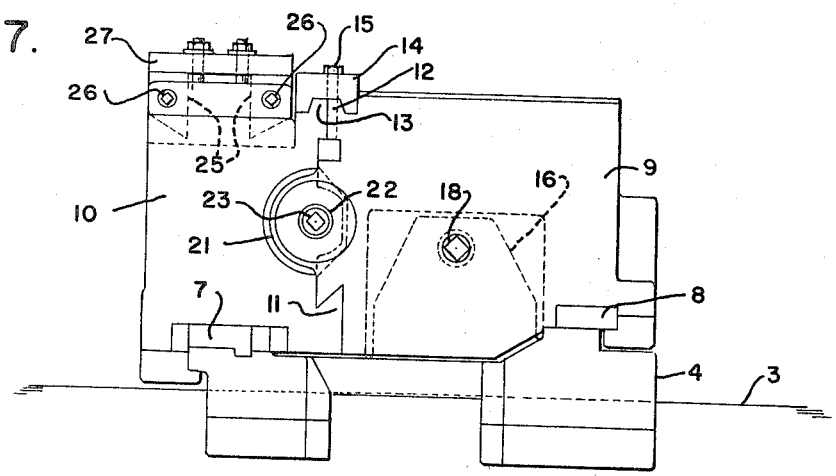
FIGURE 7 is a diagrammatic view to enlarged scale of the tool holder as shown in FIGURE 1.

As shown in FIGURE 3 the cross slide is advanced toward the work until it just clears the body of the roll R whereupon the tool post is advanced relatively to the cross slide to position the bits 28 to act on the roll neck. The cross slide and tool post together form a strong support for the tool bar minimizing cantilever effect and eliminating chattering with the result that the work can be done at optimum speed with a deep cut and the turning will be accomplished with a high degree of precision and work finish.

While we have shown and described a present preferred embodiment of the invention it is to be distinctly understood that the invention is not limited thereto but may be otherwise variously embodied within the scope of the following claims.

We claim:

1. In a lathe, a longitudinal guideway, a carriage movable along the guideway, a cross slide mounted on the carriage adjustably positionable transversely of the carriage, a tool post mounted directly on the carriage and adjustably positionable transversely of the carriage, means for fastening together the cross slide and the tool post in respective adjusted transverse positions thereof on the carriage and tool means carried by the tool post.

2. In a lathe, a longitudinal guideway, a carriage movable along the guideway, a cross slide mounted on the carriage adjustbly positionable transversely of the carriage, means acting between the carriage and the cross slide for moving the cross slide relatively to the carriage, a tool post mounted directly on the carriage and adjustably positionable transversely of the carriage, means acting between the cross slide and the tool post for moving the tool post relatively to the cross slide, means for fastening together the cross slide and the tool post in respective adjusted transverse positions thereof on the carriage and tool means carried by the tool post.

3. In a lathe, a longitudinal guideway, a carriage movable along the guideway, a plurality of transverse infeedways carried by the carriage, a cross slide slidably mounted on one of the infeedways, a tool post slidably mounted on another infeedway, the cross slide and tool post being individually slidable on their respective infeedways to selective adjusted relative positions, means fastening together the cross slide and tool post when in a selected adjusted relative position, means for moving the cross slide and tool post when fastened together along the infeedways and tool means carried by the tool post.

4. In a lathe, structure as claimed in claim 3 in which the cross slide and the tool post have portions in contact with each other and means including bolt means for fastening the cross slide and tool post together.

5. In a lathe, structure as claimed in claim 3 in which the cross slide and the tool post have a relatively slidable interfitting connection.

References Cited by the Examiner

UNITED STATES PATENTS

| | | | |
|---|---|---|---|
| 1,366,249 | 1/1921 | Cunningham | 82—25 |
| 1,409,243 | 3/1922 | Schmidt et al. | 82—25 X |

WILLIAM W. DYER, Jr., *Primary Examiner.*

LEONIDAS VLACHOS, *Examiner.*